（12）United States Patent
Bizzarri et al.

(10) Patent No.: US 8,295,826 B2
(45) Date of Patent: Oct. 23, 2012

(54) SYSTEM FOR MONITORING THE QUALITY OF SERVICE IN A COMMUNICATION NETWORK

(75) Inventors: Simone Bizzarri, Turin (IT); Paolo Bostica, Turin (IT); Marco Tosalli, Turin (IT); Michele Vitale, Rome (IT)

(73) Assignee: Telecom Italia S.p.A., Milan (IT)

( * ) Notice: Subject to any disclaimer, the term of this patent is extended or adjusted under 35 U.S.C. 154(b) by 1093 days.

(21) Appl. No.: 11/794,471

(22) PCT Filed: Dec. 30, 2004

(86) PCT No.: PCT/IB2004/004308
§ 371 (c)(1),
(2), (4) Date: Aug. 15, 2007

(87) PCT Pub. No.: WO2006/070218
PCT Pub. Date: Jul. 6, 2006

(65) Prior Publication Data
US 2008/0214186 A1 Sep. 4, 2008

(51) Int. Cl.
*H04W 24/00* (2009.01)
*H04M 1/00* (2006.01)
*H04M 3/00* (2006.01)
*H03C 1/62* (2006.01)

(52) U.S. Cl. ........ 455/425; 455/558; 455/423; 455/424; 455/115.1; 455/418

(58) Field of Classification Search .......... 455/423–425, 455/115.1, 115.3, 115.4, 67.1, 67.14, 418–420
See application file for complete search history.

(56) References Cited

U.S. PATENT DOCUMENTS

| | | | |
|---|---|---|---|
| 6,434,364 B1* | 8/2002 | O'Riordain | 455/67.11 |
| 7,245,725 B1* | 7/2007 | Beard | 380/270 |
| 2002/0013163 A1* | 1/2002 | O'Prey | 455/558 |
| 2004/0058652 A1* | 3/2004 | McGregor et al. | 455/67.13 |

FOREIGN PATENT DOCUMENTS
EP 1 304 831 B1 4/2003

OTHER PUBLICATIONS

Caire, et al., "A communication protocol for agents on handheld devices", AAMAS, Bologna, Italy, pp. 1-8, (Jul. 15-16, 2002).
ETSI TS 102 223, "Smart cards; Card Application Toolkit (CAT) (Release 6)", V6.2.0, pp. 1-154, (Sep. 2003).

* cited by examiner

*Primary Examiner* — Marisol Figueroa
*Assistant Examiner* — Dung Hong
(74) *Attorney, Agent, or Firm* — Finnegan, Henderson, Farabow, Garrett & Dunner, L.L.P.

(57) ABSTRACT

Monitoring system includes a set of peripheral monitoring agents including processing functionalities housed in SIMS. Such processing functionalities, depending at least on operating conditions of each terminal and its respective SIMS, are able to adaptively establish a distribution of measuring functionalities included in the peripheral monitoring agents between the terminal itself (for example storing them in the related memory or multimedia card) and its respective SIM.

20 Claims, 4 Drawing Sheets

SYSTEM FOR MONITORING THE QUALITY OF SERVICE IN A COMMUNICATION NETWORK

CROSS REFERENCE TO RELATED APPLICATION

This application is a national phase application based on PCT/IB2004/004308, filed Dec. 30, 2004.

FIELD OF THE INVENTION

The present invention refers to the techniques for monitoring the Quality of Service or QoS. In particular, the invention deals with a system for monitoring the quality of service in a communication network.

DESCRIPTION OF THE PRIOR ART

With the outcome and development of telecommunications networks of the mobile type (GSM, GPRS, UMTS, WLAN), the variety and number of voice, data, multimedia services that a service provider/operator is able to offer to its customers is constantly growing.

For a service provider/operator, being able to obtain an accurate and reliable monitoring of the Quality of Service (or QoS) level offered to users is thereby more and more a major need.

Examining next some contributions in the art, U.S. Pat. No. 6,434,364 discloses a communication system supporting test "agents" (MTSA) that are software modules run on mobile stations in order to put them in a "test" mode. In a "test" mode, each mobile station is configured according to parameters defined by a MTSA, to allow for system performance measurements. Each MTSA represents an addressable and active computer program that can observe and start activities in its scenario, can communicate with other agents and can be transported across data networks that are configured to take performance measurement.

EP 1304831 discloses a monitoring agent for monitoring, transferring and distributing specific channel QoS data in a mobile packet communication network. The monitoring agent has three functions: the first one is pre-processing and transforming QoS data into a form that is adapted to applications, the second one is transmitting data in a network and the third one is distributing QoS data to user applications. The monitoring agent is placed at least on the user equipment, in the RNC (Radio Network Controller) and in the SSGN (Serving GPRS Support Node) and GGSN (GPRS Gateway Support Node).

Moreover, US 2004/0058652 discloses a method and a system for monitoring the quality of service associated to a wireless network including at least one mobile device and a fixed transceiver, connected via radio to the mobile device. On the network, mobile devices perform measures of MQoS (Quality of Experience) coefficients that are processed in order to determine the quality of service perceived by mobile devices themselves. Processed data are provided via radio to the fixed transceiver. The MQoS monitoring system is divided into two components, a client component and a server component. The server component resides on a server that can be part of, or coupled to the transceiver. The client component of the monitoring system can be integrated in one or more mobile devices or can be implemented as a software integrated in the operating system of a SIM or USIM, or can be a J2ME application, a JavaCard application and the like.

OBJECTS AND SUMMARY OF THE PRESENT INVENTION

The Applicant has analyzed the problem of performing the QoS monitoring in a way that can be adapted to the conditions in which terminals connected to the communication network and the related SIMs operate.

The Applicant has also analyzed the problem of performing the QoS monitoring independently from the type of terminal used by the user.

It is suitable to specify that in the following description the term "SIM" refers to a SIM-card or a USIM-card or a Smart-card or more generally to any card that is removable from the terminal and is adapted to allow identifying and/or authenticating of a user in a network and is equipped with at least one microprocessor, comprising at least one data processing logic (CPU) and one memory, and an interface towards suitable development environments to allow loading new applications in the microprocessor memory.

Moreover, in the following description, the term "operating conditions", referred to each terminal and its respective SIM, means the set of operating conditions of the terminal and its respective SIM that can comprise: terminal memory usage, SIM memory usage, terminal CPU processing load, SIM CPU processing load, data transfer speed between terminal and respective SIM (that is a performance limit affecting the communication capability, defined by the standards, between terminal and SIM itself).

The invention solves the above-described technical problem through a monitoring system comprising a set of peripheral monitoring agents including processing functionalities housed on the SIMs. Such processing functionalities, depending at least on the operating conditions of each terminal and its respective SIM, are able to adaptively establish a distribution of measuring functionalities included in peripheral monitoring agents between the terminal itself (for example storing them in the respective memory or multimedia card) and the respective SIM.

The peripheral monitoring agents also comprise initialisation functionalities that are housed on the SIMs in order to make the QoS monitoring independent from the type of terminal used by the user.

More specifically, the system for monitoring the quality of service in a communication network comprising at least one terminal (TM) and at least one SIM adapted to be housed in said terminal (TM), comprises at least one monitoring agent (MEA1, MEA2, MEM, CA1) including processing functionalities (MEM) housed on said SIM and measuring functionalities (MEA1, MEA2), said processing functionalities (MEM) being configured in order to adaptively distributing said measuring functionalities (MEA1, MEA2) between said terminal (TM) and said SIM depending at least on detected operating conditions of said terminal (TM) and said SIM.

Another aspect of the present invention deals with a method for monitoring the quality of service in a communication network comprising at least one terminal (TM) and at least one SIM adapted to be housed in said terminal (TM), said method comprising the steps of:

arranging at least one monitoring agent (MEA1, MEA2, MEM, CA1) including processing functionalities (MEM) housed on said SIM and measuring functionalities (MEA1, MEA2);

configuring said processing functionalities (MEM) for adaptively distributing said measuring functionalities (MEA1, MEA2) between said terminal (TM) and said SIM depending at least on detected operating conditions of said terminal (TM) and said SIM.

Another aspect of the present invention deals with a communication network comprising said monitoring system.

A further aspect of the present invention refers to an information product that can be loaded in the memory of at least one electronic processor and comprising portions of software code for implementing the architecture and/or the process according to the invention when the product is run on an electronic processor. The reference to at least one electronic processor is clearly aimed to point out the chance of using the arrangement according to the invention at decentralised level.

Further preferred aspects of the present invention are disclosed in the dependent claims and in the present description.

BRIEF DESCRIPTION OF THE ENCLOSED DRAWINGS

The invention will now be described, merely as a non-limiting example, with reference to the enclosed drawings, in which.

DETAILED DESCRIPTION OF EMBODIMENTS OF THE INVENTION

Figure 1:
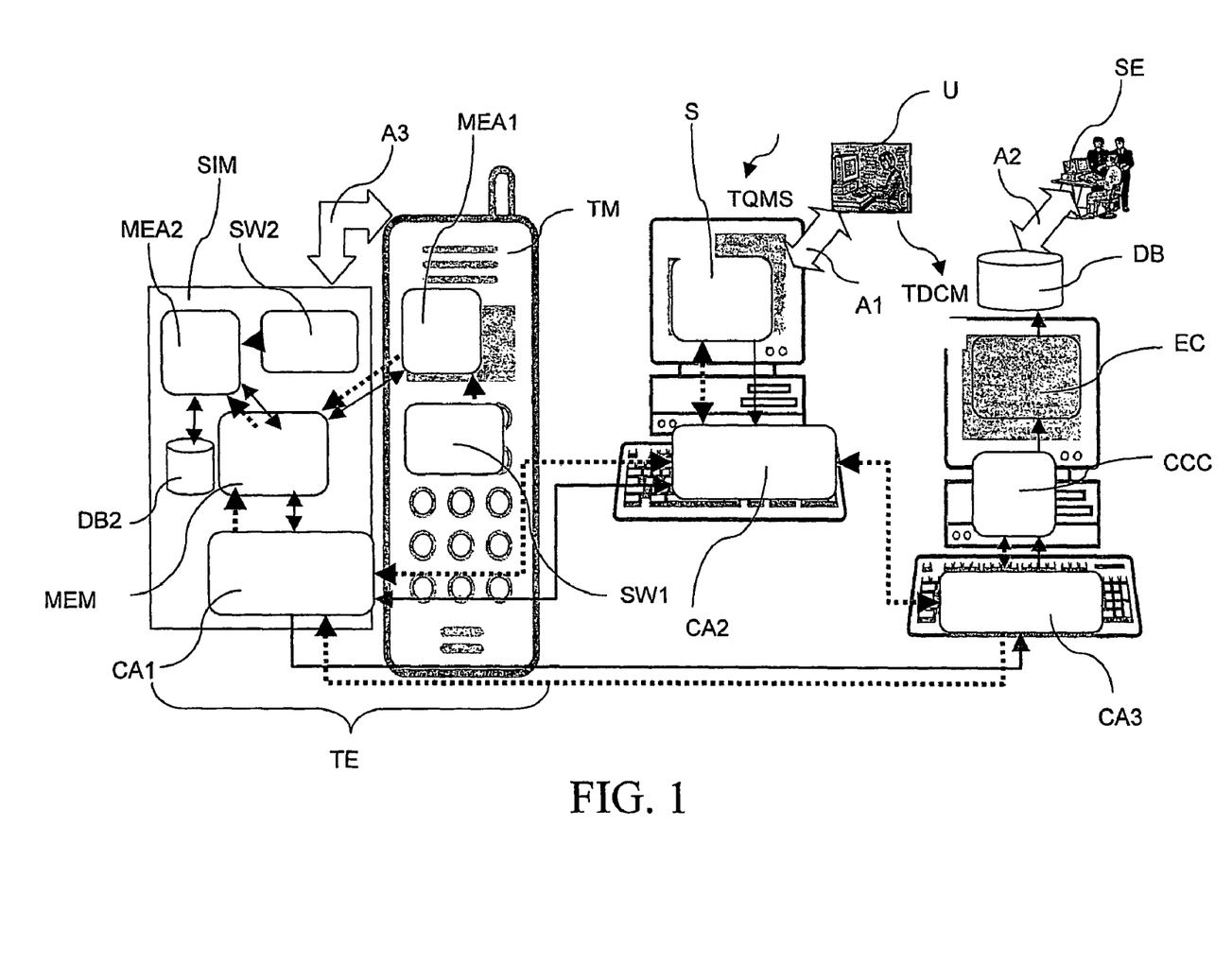
FIG. 1 is a functional block diagram showing the monitoring system according to the invention.

FIG. 1 shows a possible embodiment of the QoS monitoring system 1 in a communication network according to the invention.

It is suitable to specify that, in the following description, the term user equipment TE will mean the set of terminal TM and its respective SIM.

With reference to the embodiment shown in FIG. 1, the monitoring system 1 can comprise, at user equipment TE level, a peripheral monitoring agent (MEA1, MEA2, MEM, CA1) comprising at least:
  one measuring agent (MEA1, MEA2) (Measurement Executor Agent);
  one processing agent MEM (Measurement Elaboration Module); and
  one communicating agent CA1 (Communication Agent).

The operating functionalities of the peripheral monitoring agent (MEA1, MEA2, MEM, CA1) are distributed between terminal TM and its respective SIM as will be shown in the following description.

It can be noted that the structure of the peripheral monitoring agent (MEA1, MEA2, MEM, CA1) shown with reference to the user equipment TE can be reproduced at a level of many user equipment TE and, virtually, at a level of all user equipment TE connected to the communication network.

According to the embodiment shown in FIG. 1, the monitoring system 1 also comprises a measure management subsystem (Terminal Quality Measurement Scheduler or TQMS) that can include:
  a scheduling module S of measuring campaigns;
  a communicating agent CA2; and
  an interface A1 for interfacing with a user U (for example a service provider or a mobile telephone operator or an external program equipped with functionalities adapted to interact with the monitoring system 1).

The monitoring system 1 can also comprise a measure data collection managing subsystem (Terminal Data Collector Manager or TDCM) that, in turn, can include:
  a, data base DB;
  a processing centre EC;
  a collecting centre CCC;
  a communicating agent CA3; and
  an interface A2 for interfacing between the monitoring system 1 and possible external systems SE (for example measuring data processing systems, reporting systems, systems adapted to generate alarms for user U, etc.)

Communication between the above-described monitoring system 1 components is ensured by the communicating agents CA1, CA2 and CA3.

Moreover, the communicating agent CA2 installed in the measure management subsystem TQMS can perform the function of coordinating node between user equipment TE and measuring data collecting management subsystem TDCM, though being provided, above all for measuring data exchange, a direct communication between these two units. In the embodiment shown in FIG. 1, data lines and signalling lines between the various communicating agents are respectively represented with continuous lines and dashed lines.

It is suitable to specify that, in the following description, reference will be made to networks and mobile services, simply due to the fact that they are the most stringent environment due to the limited availability of resources, both at user equipment TE level (in terms of CPU usage and memory usage of terminals TM and their respective SIMs), and at connection level, where the channel throughput is limited by the radio access. The monitoring system 1 can anyway be extended also to services (mainly data) that use fixed ("wireline") networks or services that use mixed fixed ("wireline") and mobile ("wireless") networks with user equipment TE, being for example cellular phones or PC, connected to the network both via radio and through cables.

Herein below the operating functionalities of the different elements making the monitoring system 1 are described in more detail.

Measure Management Subsystem TQMS

The scheduling module S is arranged for configuring the measuring campaigns. For such purpose, the user U, through interface A1, interacts with the measure management subsystem TQMS defining the identifying characteristics of the measuring campaign to be performed. This operation can comprise many steps, for example:
  identifying user equipment TE subjected to measuring campaign, for example depending on information characteristics such as: agreed-upon contractual profile, type of supported service, location, belonging geographical area;
  defining the measures to be performed and the QoS indicators to be detected (compatible with previously-identified user equipment TE);
  defining characteristics of the measures to be performed (frequency of measures to be performed, measure length, inter-relationship between measures, etc.);

In order to activate the measuring campaign, the scheduling module S can perform the following operations:
  1) continuous search, for the whole length of the measuring campaign, of user equipment TE that comply with the previously-described identifying characteristics;
  2) for each located user equipment TE, the scheduling module S:
    records the user equipment TE on a data base placed inside it (with signalling towards the user U);

creates the measuring profile comprising, for example, type of measure to be performed, QoS indicators to be detected, interrelationships between measures, measures performing frequency, measure length;

transfers the measuring profile to the peripheral monitoring agent (MEA1, MEA2, MEM, CA1) being present on user equipment TE;

activates the measuring campaign on user equipment TE; and sends information about involved user equipment TE and list of expected measures to measure data collection managing subsystem TDCM together with identifying characteristics of the measuring campaign;

3) locating user equipment TE that are subjected to changes in identifying characteristics required by the measuring campaign, making them complying therewith. For these user equipment TE the scheduling module S:

deactivates the measuring campaign;

decides whether the measuring profile has to be deleted or not; and informs the measure data collection managing subsystem TDCM.

Moreover, in order to establish the end of the measuring campaign, the scheduling module S identifies for example when a time-out elapses. Upon this event, for every user equipment TE that has been involved in the measuring campaign, the scheduling module S:

deactivates the measuring campaign;

decides whether the measuring profile has to be deleted or not; and informs the measure data collection managing subsystem TDCM about the end of the measuring campaign.

Peripheral Monitoring Agent (MEA1, MEA2, MEM, CA1)

As shown in FIG. 1, in a preferred embodiment of the present invention, the operating functionalities of the peripheral monitoring agent (MEA1, MEA2, MEM, CA1) are distributed as follows:

the measuring agent (MEA1, MEA2) is partly housed on the terminal TM (measuring agent MEA1) and partly on the SIM (measuring agent MEA2);

the processing agent MEM is housed on the SIM; and the communicating agent CA1 is housed on the SIM.

More in detail, the communicating agent CA1, that can be placed on the SIM or when activating the SIM itself, through the service provider/operator, or in following steps, can have the following operating functionalities:

detecting the measuring profile coming from the scheduling module S;

regularly informing the scheduling module S about its own operating status;

requesting the measure managing subsystem TQMS to activate the downloading procedure of the processing agent MEM on the SIM and/or taking care of its update should it be already used;

activating (initialisation functionalities) the processing agent MEM;

receiving data from the processing agent MEM; and sending data to the measure data collection managing subsystem TDCM.

Figure 2A:
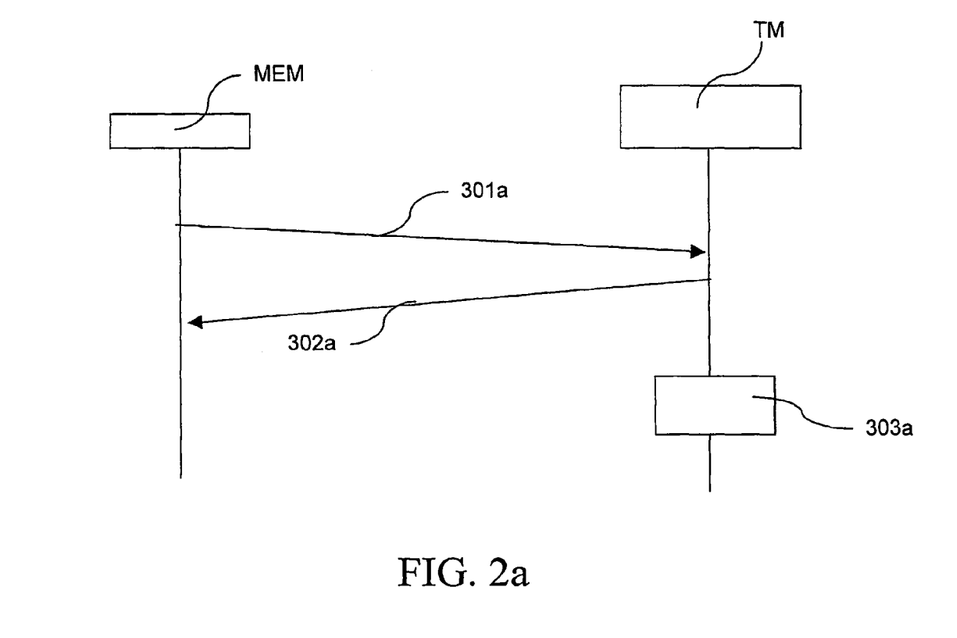
FIGS. 2a, 2b are diagrams showing the flow of interactions for using the monitoring system of FIG. 1.
Figure 2B:
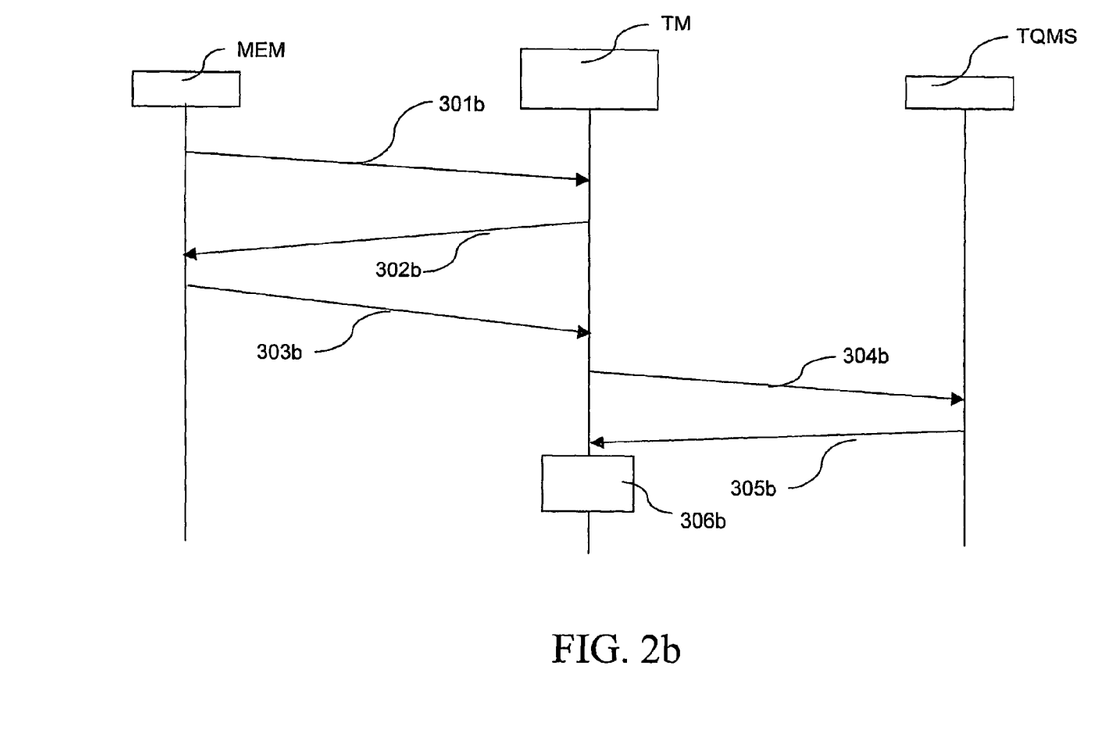

According to the present invention, the processing agent MEM is able to detect the operating conditions of the terminal TM and its respective SIM and at least depending on them, to distributed the measuring functionalities of the measuring agents MEAL and MEA2. The operating functionalities of the processing agent MEM can comprise, for example:

activating the measuring agent MEAL on the terminal TM and the measuring agent MEA2 on the SIM. As shown in FIGS. 2a, 2b, as regards the measuring agent MEA1, the activating procedure can comprise the following steps:

sending a message for activating the measuring agent MEA1 to the operating system of the terminal TM (301a, 301b);

receiving (FIG. 2a) a positive confirmation message (302a) from the operating system of terminal TM if the operating system detects the presence of the measuring agent MEAL on the terminal TM. The operating system of the terminal TM then takes care of activating the measuring agent MEAL (303a);

or:

receiving (FIG. 2b) a message that it is impossible to satisfy the request from the operating system of the terminal TM (302b), if the operating system does not detect the presence of the measuring agent MEA1 on the terminal TM; and sending a message of requesting to activate the procedure for downloading the measuring agent MEAL from the measure management subsystem TQMS to the operating system of the terminal TM (303b). The operating system of the terminal TM sends this request to the measure management subsystem TQMS (304b). The measure management subsystem TQMS downloads the measuring agent MEAL (305b) and sends it to the operating system of the terminal TM that takes care of activating it (306b);

driving additional measuring campaigns with respect to those controlled by the scheduling module S dealing, for example, with operating conditions of SIM, of terminal TM and of radio channel (herein below defined as "additional campaigns"). These additional campaigns are performed with the same modes described in the following items for the measuring campaigns driven by the scheduling module S;

detecting, by using the communicating agent CA1, the measuring profiles sent by the scheduling module S;

depending on the results obtained by the additional campaigns and the measuring profile sent by the scheduling module S, establishing the distribution of the measuring functionalities of the measuring agents MEA1, MEA2 according to the following steps (a-e):

a) classifying the types of measures required by the scheduling module S, for example discriminating those linked to events that dynamically change in time such as: terminal TM position, keys pressed on terminal TM, service session steps, etc., from those referred to static data such as: user identification, terminal type, service session origin and destination, etc.);

b) assigning a priority to each measure to be performed;

c) locating different operating modes according to which the required measures can be performed (for example, reducing the measuring sample numbers, sending the measures one by one or all together, locally storing the measures waiting for their transmission when there are radio availability conditions, etc.);

d) evaluating the effect of each operating mode according to which the required measures can be performed in terms of necessary resources for realising it (for example use of terminal TM and/or SIM memory, use of terminal TM and/or SIM CPU, radio resources usage if the communication network is a mobile communication network mobile, etc.);

e) choosing, depending on previous evaluations, how to distribute the measuring functionalities of the measuring agents MEA1, MEA2;

storing the measures received from the measuring agents MEA1 and MEA2 and sending them to the measure data collection managing subsystem TDCM through the communicating agent CA1;

informing the scheduling module S (at regular intervals) about status/position of user equipment TE; and signalling malfunction events of user equipment TE.

The measuring agent MEA1, MEA2 performs the measures and, according to the invention, is configured every time by the processing agent MEM.

For example, in the embodiment of the invention shown in FIG. 1, the measuring agent (MEA1, MEA2) comprises the measuring agent MEA1, that the processing agent MEM has established to place on the terminal TM, whose operating functionalities can for example include the execution and transmission to the processing agent MEM:

of QoS measures according to the modes required by the scheduling module S; and of context data representing the TM operating conditions, namely:

battery level;
CPU use memory;
memory use level;
etc.

According to the embodiment in FIG. 1, the measuring agent (MEA1, MEA2) comprises the measuring agent MEA2, that the processing agent MEM has established to place on the SIM, whose operating functionalities can for example include the execution and transmission to the processing agent MEM:

of QoS data of services implemented on the SIM according to the modes required by the scheduling module S;

of context data representing the SIM operating conditions, namely:

CPU use level;
memory use level;
etc.

of measures of the radio-mobile type, such as, for example: power, radio quality, handover;

of some data (for example: IMSI, IMEI, etc.) stored on the SIM itself (for example in data base DB2 as shown in FIG. 1); and of user equipment TE location information (cell identifier, etc.);

etc.

For executing the measuring campaign, it is necessary that the processing agent MEM coordinates the joint action of measuring agents MEA1 and MEA2 so that each one of them performs the measures for which it is responsible as previously established.

Interactions between peripheral agents being present on terminal TM and on its respective SIM are realised through the communication interface A3, realised for example by using similar mechanisms to the one described in ETSI TS 102.223 specification.

It can be noted that, for performing the measures related to the service application session, it can be useful to have measuring agents available also on application servers (namely servers involved in providing the service) for the various types of services.

Preferably, every measuring agent MEAL can be interfaced with:

terminal TM operating system;

the portion of application residing on terminal TM through which the user accesses the service (this interfacing occurs through a software module designated as SW1 in FIG. 1); and the processing agent MEM.

Preferably, every measuring agent MEA2 can be interfaced with:

SIM operating system and data stored thereon (data base DB2 in FIG. 1);

the portion of application residing on SIM, through which the user accesses the service (this interfacing occurs through a software module designated as SW2 in FIG. 1); and the processing agent MEM.

Moreover, the peripheral monitoring agent (MEA1, MEA2, MEM, CA1) can interact, through interfaces of the API (Application Programming Interface) type, with other processes that can be:

standard of the programming language being used (in the herein-described example, Java);

specifics of platform being used for managing processes and for communicating between peripheral agents (MEA1, MEA2, MEM, CA1) and centralised agents (communication agents CA2 and CA3);

specifics of terminal TM operating system (for example, Symbian™, Microsoft™, etc.); and specifics of SIM operating system.

Preferably, API interfaces or interfacing with applications (for example for interfacing with other environments such as JavaPhone, JavaCard etc.) are accessible by the peripheral monitoring agent (MEA1, MEA2, MEM, CA1) through a general API that releases the development of peripheral agents from operating and development environment.

Preferably, for managing/configuring the functionalities included in the peripheral monitoring agent (MEA1, MEA2, MEM, CA1) and communicating among the various functionalities, the Jade (JAVA Agent Development Framework, such as described, for example, in "A communication protocol for agents on hand held devices" AAMAS 2002, July 15-16, Bologna, Italy) technology is used, that allows developing distributed applications of the peer-to-peer type, developed in JAVA and complying with the FIPA standard; The technology, that can be used both within a fixed network (JAVA J2EE and J2SE) and within a mobile network (Personal Java and J2ME) and the related characteristics (white pages, yellow pages) are used in managing the agents. This choice is not constraining for the herein-described platform operation, since Jade could be replaced by other communication middleware between agents. Communication between agents can use different transport techniques that can be selected according to the detected operating conditions (for example if it is not possible to establish a TCP/IP connection on GPRS since it is not available, the platform can decide to use the transport on SMS). Preferably, for exchanging messages between agents, the TCP/IP or UDP/IP transport will be used. This capability of making interactions between platform modules possible occurs even when, though there is an electromagnetic coverage, the user is not able to access the service (for example in case of a UMTS network, a user could not be able to access a high-bit-rate video streaming service and, simultaneously, the terminal agents can, by choosing a suitable transport, send and receive data for and to other platform modules).

Measure Data Collection Managing Subsystem TDCM

The operating functionalities of the measure data collection managing subsystem TDCM are those of its component elements, as described in the following description.

In particular, the collecting centre CCC:

collects measure data, sent as information records, by user equipment TE involved in the measuring campaign through the communicating agents CA1;

verifies the formal correctness of received information records (possible errors introduced by transport, lack of a measure, partial measure); and:

in case of errors, requests the user equipment TE (through the communicating agent CA1 placed on the SIM) to transmit again the measure;

in a positive case (absence of errors), sends measure-related data to the processing centre EC.

This latter one, in the initial measuring campaign step, receives the configuration commands from the scheduling module S. In this way, the processing centre EC knows:

identifying characteristics of the measuring campaign (length, measure types, QoS levels to be detected, etc.);

list of user equipment TE that are potentially involved in the measuring campaign; and updates of user equipment TE status.

When processing, the processing centre EC reads the context data (namely memory usage in involved terminals and SIMs, CPU usage, etc.) of every measure received by the collecting centre CCC for:

associating them to the performed measuring campaign and verifying the real chance of associating to the identification characteristics of the measuring campaign itself;

recognising and checking the sequential (time) order of information records being sent from user equipment TE and, possibly, recognising the last elementary measure for the performed measuring campaign;

sending a notification to user U when one of the following events a), b) occurs:

a) update of the number of measures sent by every involved user equipment TE;

b) possible errors detected on peripheral agents (for example the elapse of a time-out dealing with the recording of an event by the peripheral agent);

recognising the measuring campaign end (in a synchronised way with the scheduling module S).

When a measuring campaign ends, the measure data collection managing subsystem TDCM applies a criterion for accepting or not accepting the information records received from user equipment TE (for example those received after the measuring campaign end and dealing with events started before the end of the campaign itself, or those that are still incomplete), then processing the correct information records with the modes provided by the campaign and storing them in data base DB.

Herein below, the operating steps involving the herein-described monitoring system 1 are described in more detail.

Initially, it is assumed that, upon a subscription by a user, of the contract with a service provider/operator in order to exploit the service provided by the monitoring system 1, the user SIM is configured by placing the communicating agent CA1 thereon. This operation will make the user equipment TE, belonging to the user, known to the measure management subsystem TQMS for locating the user equipment TE itself.

In a preferred embodiment of the present invention, the communicating agent CA1 can be placed on the user SIM directly by the service provider/operator before his subscription. In this way, the service provider/operator is not compelled to operate on the terminal TM, but only on the SIM (that he himself distributes).

Figure 3:
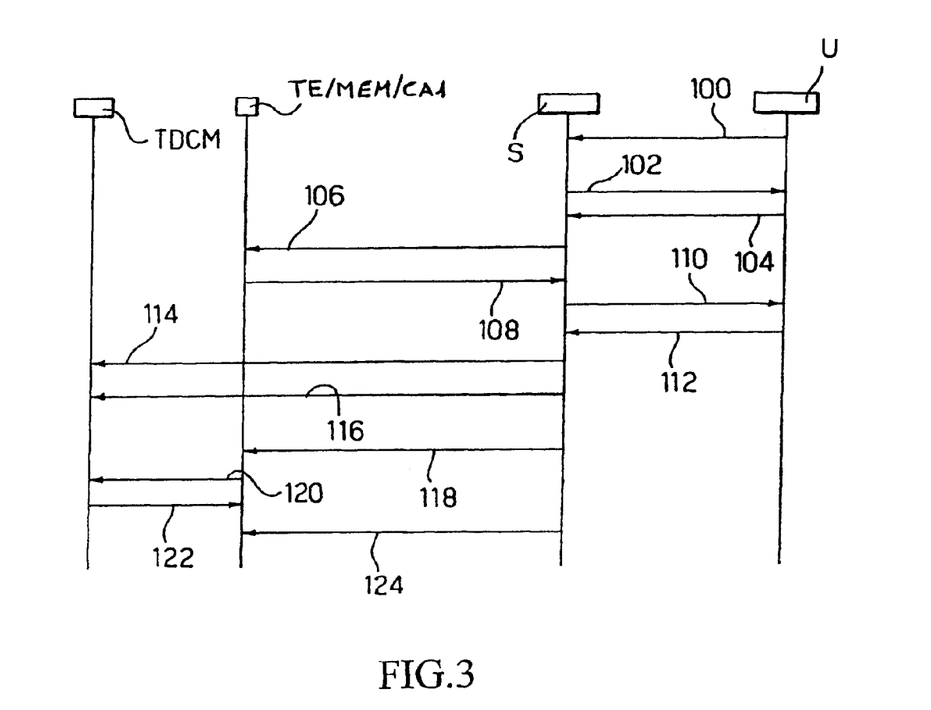
FIG. 3 is a diagram showing the steps of activating and performing a measure with following measure storing in a collecting centre within the monitoring system of FIG. 1.

Afterwards, by referring to FIG. 3, it is assumed that the monitoring system 1 is interested in the following operations:

user U interacts (step 100 in FIG. 3) with the scheduling module S defining the identifying characteristics of the measuring campaign, whose status is notified to user U in a step 102;

the scheduling module S identifies the potential user equipment TE interested in the measuring campaign; the result of this operation can be notified to user U that can decide whether going on with the measuring campaign by expressing his consent in a step 104;

the scheduling module S creates the adequate measuring profiles for every user equipment TE involved in the measuring campaign; the measuring profile is associated with a timing criterion when sending measures by user equipment TE to avoid possible communication network overloads;

in a step 106, the measuring profile created by the scheduling module S is transferred to each processing agent MEM placed on SIMs of user equipment TE that are potentially involved in the measure (this procedure is detected by the processing agent MEM, if the user equipment TE on which it is placed is active at that time, in a step 108); the operation result is notified in a step 110 to user U: user U can then decide whether the measuring campaign is actually performed (being able to choose whether the measuring campaign has to be performed on equipment TE that are active at the beginning or also on potential user equipment TE, with the possible management of current communications);

in case of assent by user U (expressed in a step 112), the scheduling module S automatically starts the measuring campaign on board user equipment TE configured through a command of the multicast type (the synchronisation function between scheduling module S, peripheral agents and measure data collection managing subsystem TDCM, provided by the GPS (Global Positioning System) system, could be used, when possible, also preparing the list of potentially involved user equipment TE and the list of expected measures from every-equipment and sending these information, in steps designated as 114 and 116 in FIG. 3, to the measure data collection managing subsystem TDCM together with measuring campaign identification characteristics;

during the measuring campaign, the scheduling module S keeps track of the status of user equipment TE that are potentially involved in the measuring campaign itself; these information are used (a-c):

a) in order to activate and/or re-activate (step 118) the measuring campaign on user equipment TE that will be activated later that the start of the measuring campaign itself;

b) in order to suspend or deactivate the measuring campaign on user equipment TE that, during the measuring campaign itself, are subjected to changes in parameters and/or major characteristics;

c) when processing the measures, at the end of the measuring campaign, to point out possible inconsistencies of collected measure data with respect to scheduled data (not performed measures, partial measures, measures suspended due to user equipment TE unavailability or overload, measures with errors, lack of reception when collecting);

upon activating, by the scheduling module S, the measuring campaign (step 118), the processing agent MEM distributes the measuring functionalities (measuring agents MEA1, MEA2) between terminal TM and respective SIM depending on terminal TM operating conditions, its respective SIM and also the network;

the measuring agents MEA1, MEA2 perform the provided measures, store them in information records and send the to the communicating agent CA1;

the communicating agent CA1 sends to the measure data collection managing subsystem TDCM (in a step 120) the information records obtained from measuring agents MEA1, MEA2 that comprise, in addition to elementary measures and/or computer parameters, also context and operating data associated with the measures (namely: memory and CPU usage of terminal TM and its respective SIM, radio power, radio quality etc.);

the measure data collection managing subsystem TDCM receives the information records sent by the communicating agent CA1 and verifies their correctness (detecting possible errors inserted by transport, lack of measure, partial measure) feeling back towards user equipment TE in a step 122; in addition to having a reception confirmation (ACK) characteristic, the feedback can take the measure data collection managing subsystem TDCM to require the user equipment TE, in case of error, the measure re-transmission (through the error managing function, possibly providing for the storage, for a certain period, on user equipment TE, of performed measures in order to be able to transmit them back afterwards);

the measure data collection managing subsystem TDCM, recognising the list of user equipment TE potentially involved in the measuring campaign, and the measuring campaign identifying characteristics (namely, limit length, services to be monitored, etc.), reads the context data of every measure for (a-c):

a) verifying the real chance of association to adopted identifying characteristics and, in a positive case, storing their elementary measure and context data in data base DB;

b) recognising and checking the sequential (time) order of information records, and the last elementary measure performed for such specific measuring campaign;

c) sending a notification to user U when one of the following events (i-iii) occurs:

i) update of the number of measures sent by every involved user equipment TE;

ii) possible errors detected on peripheral agents (for example, the elapse of a time-out and the lack of recording of an event by a peripheral agent);

iii) end of the measuring campaign;

when the measuring campaign ends, the measure data collection managing subsystem TDCM applies a criterion to decide whether accepting or not the detected measure data received after the end of the measuring campaign dealing with events started before the campaign conclusion;

at the end of a campaign, in a step 124, the measure management subsystem TQMS deactivates the measuring agents MEA1 and MEA2 (through the communicating agent CA1 and the processing agent MEM) and the measure data collection managing subsystem TDCM processes the corrected information records with modes provided by the campaign itself, computes quality indexes and stores them in a second data base that is logically different from the one where elementary measures are stored.

Figure 4:
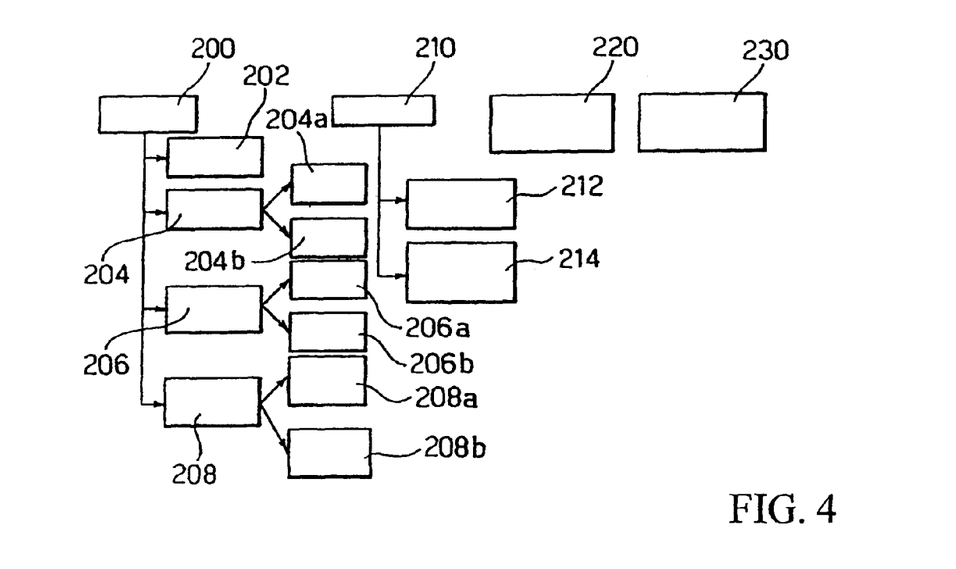
FIG. 4 is still another functional block diagram showing the possible types of use of the monitoring system in FIG. 1, seen on the terminal side.

The diagram in FIG. 4 shows as an example some possible use scenarios of the monitoring system 1.

The use scenarios of the monitoring system 1 that are herein specifically pointed out are first of all related to QoS monitoring, shown as 200 in the diagram in FIG. 4. Such set of function typically comprises:

measures 202 performed by user equipment TE (for example evaluating radio connection quality), taking also into account the data stored on SIM;

measures 204 of end-to-end performance (user equipment TE side or server side) as well driven by the service provider/operator (204a) as driven by user (204b), this latter one through a suitable software application installed on its own user equipment TE);

measures 206 of user equipment TE/server performance, also here as well driven by the service provider/operator (206a) as driven by user (206b);

check 208 of agreements of the SLA type underwritten at user level and service provider/operator level, also in this case as well driven by the service provider/operator (208a) as driven by user (208b) (through a user interaction with a suitable software application installed on its own user equipment on TE).

The use of the monitoring system 1 is then provided for troubleshooting functions, namely for locating possible QoS degrading causes within the user equipment TE.

This set of functions, globally designated as 210, essentially comprises the decoding and signalling of malfunctions (user equipment TE side and/or application server side).

The diagram in FIG. 4 expressly points out that such functions can be decided both by the service provider/operator (block 212), and by the user U (block 214).

Always in the diagram in FIG. 4, the blocks 220 and 230 finally point out the possible application of the monitoring system 1 to the diagnostics of internal user equipment TE resources and functions and the optimised configuration and management of resources (for example in real time) from a quality of service (QoS) point of view.

For example with reference to block 220, in case of multimedia service malfunction, the video component can be removed in order to deliver at least the audio component with an acceptable quality.

With reference to block 230, it is possible for example to provide the user with an automatic update of software applications installed on its equipment when a now obsolete version of these applications does not allow obtaining an optimum QoS level.

Advantageously, the monitoring system according to the invention is for example able to:

contextually and globally measure, in a radio-mobile environment, depending on calls, quality parameters and operating conditions of the connection in the service access point nearest to user perception (therefore on terminal TM and/or respective SIM and at application level);

measure not only the quality session parameters (availability, accessibility, connection maintenance, delays, errors, losses on information contents), but also to contextually detect the operating conditions of radio channel (power, BER etc.), of connection (throughput), of terminal (CPU load, buffer and memory use, etc.), with which such session has been obtained;

associate to the measure also user equipment TE location data;

segment the quality degrade between network/user equipment TE/application server;

transparently perform measures, on user equipment TE, either in a real traffic on current communication, or by activating measures in an artificial traffic (on sessions activated by the service provider/operator);

dynamically manage (also in remote) both user equipment TE on which measures has to be performed, and measures profile (parameters, measure modes), perform measures both by the service provider/operator and by the user;

automatically manage download, processing and local storage modes (on terminal TM or on its respective SIM) of measures, depending on the processing load of terminal TM, its respective SIM and radio channels;

obtain independency of monitoring system from network technology, choosing the most adequate transport mode, among the available ones (that minimises the impact on the communication network load) for realising communications among monitoring system agents.

Moreover, the chance of making one or more operating functionalities of peripheral monitoring agents reside on SIMs allows both correlating the measures performed by the monitoring system with user-related data and with subscribed service profile to which the user can access (for example for associating the delivered QoS level with the subscribed SLA), and the chance of accessing to already available measures on the SIM (for example, measures related to mobile telephone network, such as bit error rate and power measures).

Moreover, the monitoring system 1 is suitable for performing the QoS monitoring also in evolved multi-standard environments (for example UMTS/W-LAN) in which a smart multi-mode terminal is able to simultaneously use many access systems for transporting information (communication formed of many parallel links on many radio systems).

Still further, the herein-described monitoring system for end-to-end QoS monitoring for services supported by radio-mobile user equipment can be used, through an ad hoc interface API (Application Program Interface) development, with operating and development environments of fixed networks (LAN, MAN and WAN) and wireless networks (W-LAN). Moreover, such system can operate in multi-standard environments on board multi-mode terminals.

Obviously, notwithstanding the principle of the invention, the constructive parts and the embodiments can be widely changed with respect to what has been described and shown, without thereby departing from the scope of the present invention, as defined by the attached claims.

The invention claimed is:

1. A system for monitoring the quality of service in a communication network comprising:
at least one terminal;
at least one SIM housed in said terminal; and
at least one monitoring agent comprising:
processing functionalities housed in said SIM; and
measuring functionalities distributed between said terminal and said SIM for performing measures, said processing functionalities being configured for:
identifying operation modes according to which the measures are performed, wherein each operation mode includes at least one of a measuring mode specifying measuring sample numbers, a transmission mode specifying a manner the respective measure is transmitted between said terminal and said SIM, or a storage mode specifying a location where the respective measure is stored;
determining resources required for performing the measures using the respective operation modes;
driving the measuring functionalities located on said terminal and said SIM to detect operating conditions of said terminal and said SIM, respectively; and
adaptively distributing said measuring functionalities between said terminal and said SIM depending at least on the resources required for performing the measures and the detected operating conditions of said terminal and said SIM.

2. The system according to claim 1, wherein said operating conditions comprise one or more of the following operating conditions of said terminal and said SIM:
memory usage of said terminal and said SIM;
CPU processing load of said terminal and said SIM; and
data transfer rate between said terminal and said SIM.

3. The system according to claim 1, wherein said monitoring agent comprises initialisation functionalities housed in said SIM.

4. The system according to claim 1, comprising at least one measure managing subsystem comprising at least one scheduling module for scheduling measuring campaigns, said measuring campaigns involving at least one set of terminals and respective SIM housing said monitoring agent.

5. The system according to claim 4, wherein said scheduling module is configured for determining identifying characteristics of a measuring campaign by performing one or more of the steps of:
identifying a set of terminals and respective SIMs to be involved in said measuring campaign depending on one or more information characteristics among: contractual profile of the user owning the terminal and SIM, type of services supported by terminal and SIM, terminal position, and geographical area to which the terminal belongs;
defining the measures to be performed and the quality of service indexes to be detected; and
defining the characteristics of the measures to be performed.

6. The system according to claim 5, wherein said characteristics of measures to be performed comprise one or more of the following parameters:
frequency of measure execution, measure length, and interrelationships between measures.

7. The system according to claim 6, wherein, in order to activate said measuring campaign, said scheduling module performs one or more of the steps of:
searching the set of terminals and respective SIMS complying with said identifying characteristics of said measuring campaign;
recording said set of terminals and respective SIMS on a data base included in said scheduling module;
creating a measuring profile;
sending said measuring profile to said monitoring agent;
activating said measuring campaign on the set of terminals, and respective SIMs recorded in said data base included in said scheduling module; and
sending information about said set of terminals and respective SIMs and a list of measures to be performed to said measure data collection managing subsystem.

8. The system according to claim 7, wherein said measuring profile comprises one or more of the following information: type of measures to be performed, quality of service indicators to be detected, interrelationships among measures, frequency of measures execution, and measure length.

9. The system according to claim 8, wherein said processing functionalities distribute said measuring functionalities depending at least on said measuring profile.

10. The system according to claim 7, wherein said scheduling module is configured for performing one or more of the steps of:
locating among said set of terminals and respective SIMs subjected to said measuring campaign those that are subjected to a change of identifying characteristics of said measuring campaign; and deactivating said measuring campaign for these terminals and respective SIMs.

11. The system according to claim 4, wherein said measure managing subsystem comprises an interface for interfacing with a user.

12. The system according to claim 1 comprising a measure data collection managing subsystem, said subsystem comprising at least one of a data base for storing measure data and a processing centre for processing measure data.

13. The system according to claim 12, wherein said monitoring agent comprises communication functionalities configured for managing the transfer of measure results toward said measure data collection managing subsystem.

14. The system according to claim 13, wherein said measure data collection managing subsystem comprises at least one communication functionality subjected to be interfaced with said communication functionality included in said monitoring agent.

15. The system according to claim 14, wherein said communication functionality included in said measure managing subsystem is subjected to be interfaced with a communication functionality included in said measure data collection managing subsystem.

16. The system according to claim 15, wherein said communication functionality included in said measure data collection managing subsystem is configured for communicating with said communication functionality included in said monitoring agent.

17. The system according to claim 12, wherein said measure data collection managing subsystem comprises a respective interface for interfacing between said monitoring system and external systems.

18. A communication network comprising a monitoring system according to claim 1.

19. A method for monitoring the quality of service in a communication network comprising at least one terminal and at least one SIM housed in said terminal, comprising the steps of:
providing at least one monitoring agent comprising processing functionalities housed in said SIM and measuring functionalities distributed between said terminal and said SIM for performing measures;
identifying operation modes according to which the measures are performed, wherein each operation mode includes at least one of a measuring mode specifying measuring sample numbers, a transmission mode specifying a manner the respective measure is transmitted between said terminal and said SIM, or a storage mode specifying a location where the respective measure is stored;
determining resources required for performing the measures using the respective operation modes;
driving the measuring functionalities located on said terminal and said SIM to detect operating conditions of said terminal and said SIM, respectively; and
adaptively distributing said measuring functionalities between said terminal and said SIM depending at least on the resources required for performing the measures and the detected operating conditions of said terminal and said SIM.

20. A non-transitory computer readable medium encoded with a computer program product loaded in the memory of at least one electronic processor, and comprising portions of software code for implementing the method according to claim 19.

* * * * *

UNITED STATES PATENT AND TRADEMARK OFFICE
CERTIFICATE OF CORRECTION

| | |
|---|---|
| PATENT NO. | : 8,295,826 B2 |
| APPLICATION NO. | : 11/794471 |
| DATED | : October 23, 2012 |
| INVENTOR(S) | : Simone Bizzarri |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1223 days.

Signed and Sealed this
Eighth Day of July, 2014

Michelle K. Lee
*Deputy Director of the United States Patent and Trademark Office*